Aug. 22, 1967   F. VECCHIARELLI ET AL   3,336,714
SOLAR CELL
Filed Aug. 21, 1964   3 Sheets-Sheet 2
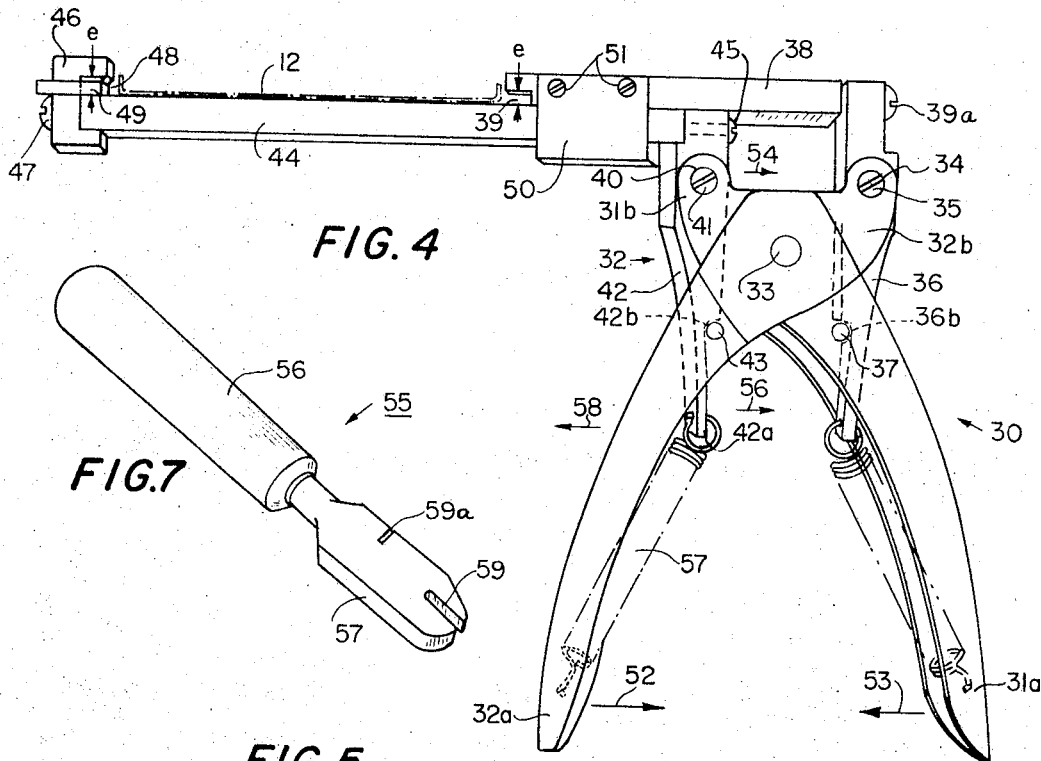
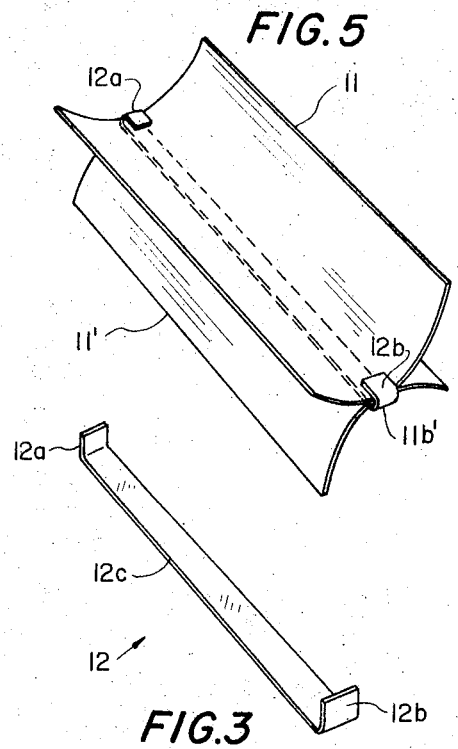
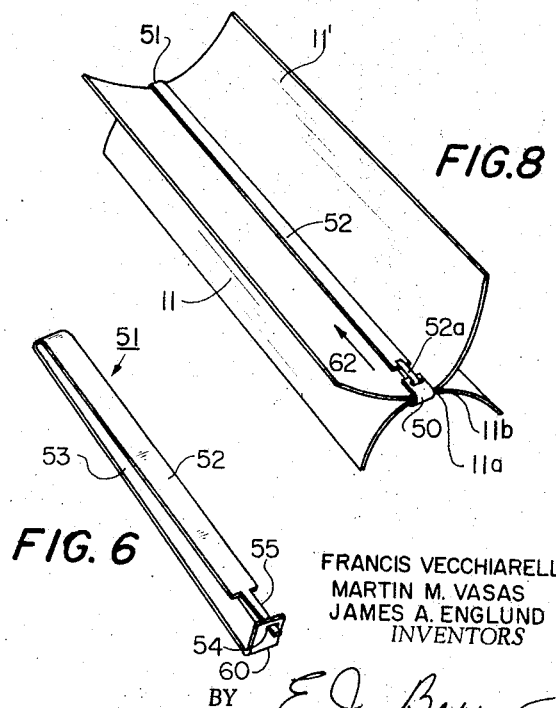
FRANCIS VECCHIARELLI
MARTIN M. VASAS
JAMES A. ENGLUND
INVENTORS

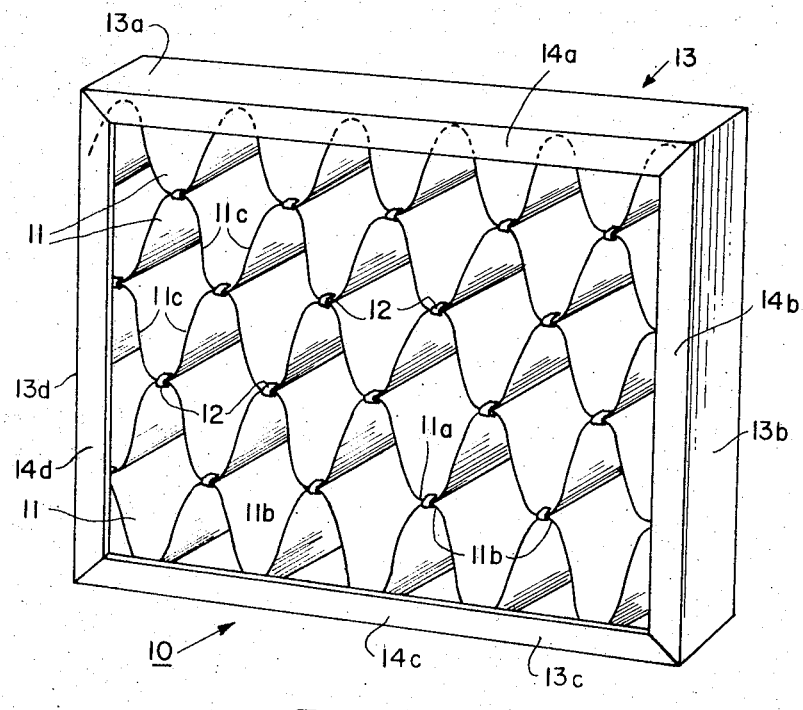
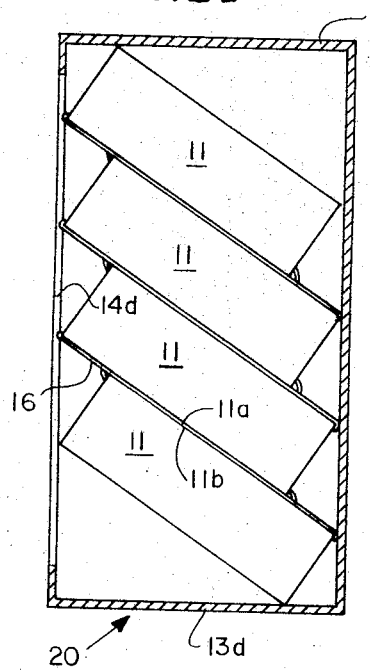
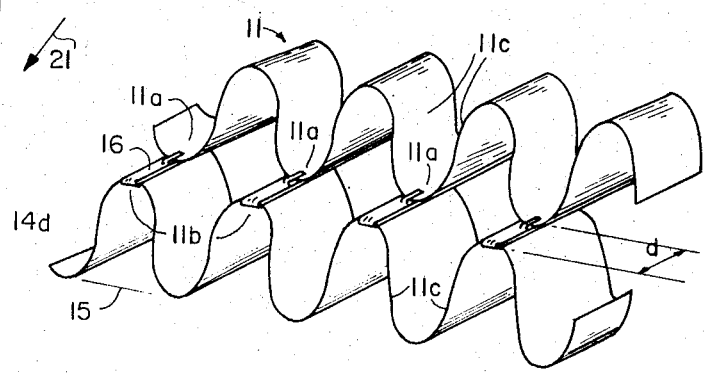
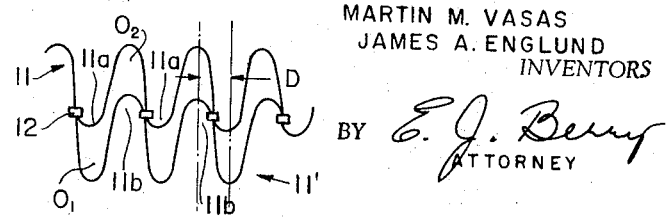

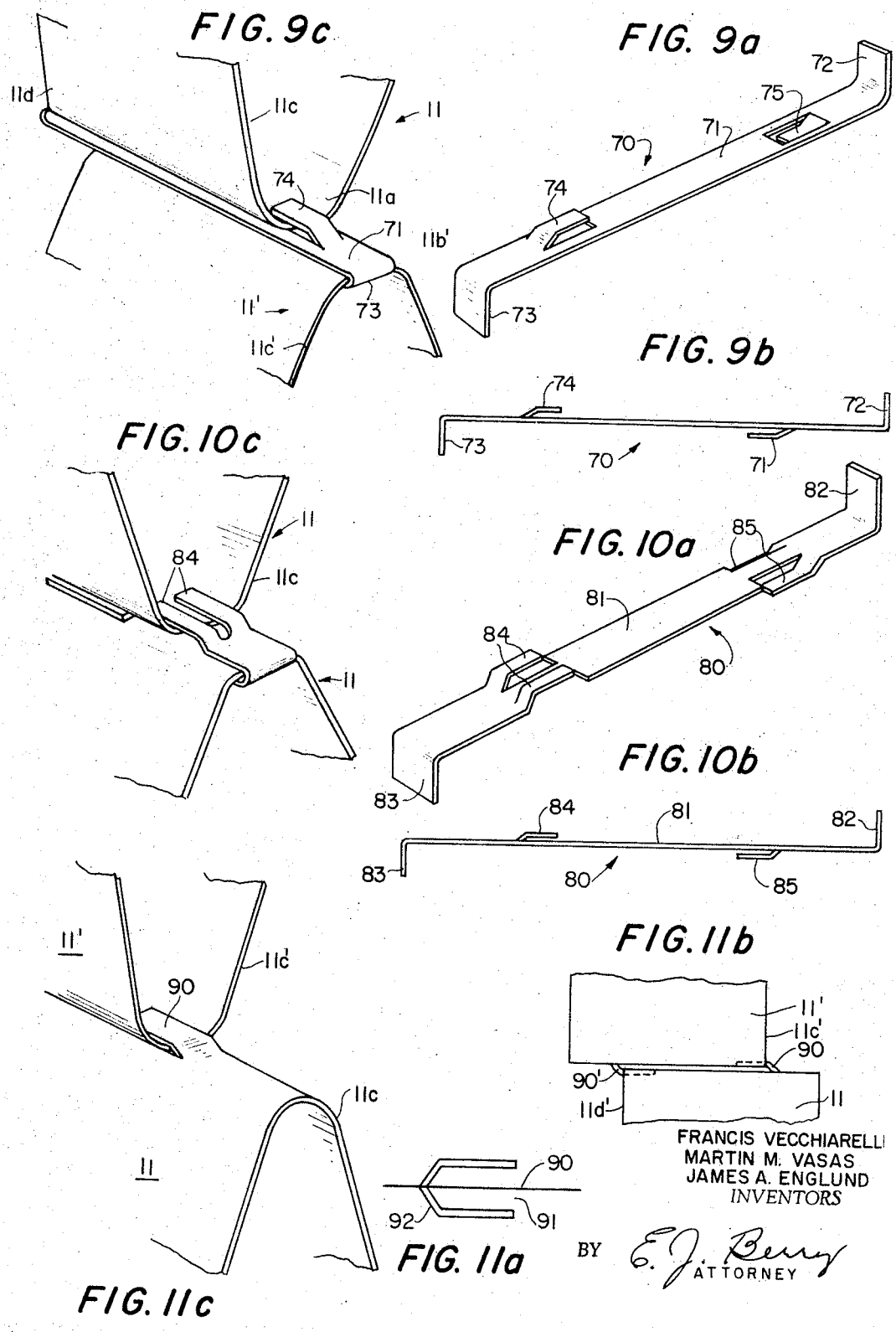

United States Patent Office 3,336,714
Patented Aug. 22, 1967

3,336,714
SOLAR CELL
Francis Vecchiarelli, River Edge, N.J., and Martin M. Vasas, Bridgeport, and James A. Englund, Fairfield, Conn., assignors, by mesne assignments, to Alcan Aluminum Corporation, New York, N.Y., a corporation of New York
Filed Aug. 21, 1964, Ser. No. 391,185
6 Claims. (Cl. 52—473)

The instant invention relates to a structure for shading the sun's rays and more particularly to a solar cell having a particular configuration so as to exclude particular inclinations of solar rays and an advantageous method for forming such solar cells.

Light permeable structures find widespread use throughout the building industry. One typical use of such structures is to provide a fence or barrier surrounding all or part of the property wherein the light permeable structure provides a degree of privacy, while at the same time permitting substantial penetration of solar rays therethrough. The underlying concept is that horizontal light, i.e., light from ground objects, may penetrate from the solar cell arrangement while all direct radiation from the sun is stopped by the solar cell. This is important in minimizing costs for air conditioning. By causing the solar screen to cut out the sun, it therefore absorbs a great portion of solar radiation energy and shades the wall of the building which it surrounds from the heat effects of the sun while the air surrounding the walls cools the exterior to its own level rapidly. These light permeable structures may be provided in any color combinations, thereby supplying the additional feature of providing an aesthetically appealing structure.

One typical light permeable structure is formed of substantially thin, elongated ductile metal sheets which are formed in such a manner as to have a corrugated profile. A plurality of such corrugated metallic sheets are stacked one upon the other to form a solar cell and may be placed in a rectangular-shaped frame which defines the periphery of the cell. The stacking of the corrugated sheets is done in such a manner that the lower apexes of the lowermost corrugated sheet rest upon the base of the rectangular frame. The next corrugated sheet is stacked in such a manner as to have its lower apexes rest upon the upper apexes of the lowermost sheet. This places two surfaces in contact, which surfaces have an arcuate shape, thus making the engagement therebetween extremely unstable. This condition of instability thereby enables the corrugated sheets to experience motion relative to one another, destroying the support between each sheet and further, markedly affecting the uniformity in appearance of the solar cell and hence, substantially destroying its aesthetic qualities.

The instant invention provides a novel means for securement of corrugated or folded sheets to one another which enables the corrugated or folded sheets to be stacked one upon the other and secured to one another in such a way as to preserve the uniformity in appearance and strength of the solar cell.

After formation of the corrugated sheets they are stacked one upon the other so that the apexes of adjacent corrugated sheets engage one another. A novel substantially C-shaped clip is then positioned along the underside of each apex of one sheet and the flanges of the clip are pressed down in such a way as to rigidly engage the upper surface of the uppermost sheet and at the same time to flatten the apexes of the engaging sheets to prevent any relative lateral motion between the two engaging apexes. The bending over and the forming of the clip flanges securely holds the deformed surfaces of the apexes together to prevent any relative movement therebetween.

The C-shaped clip may be applied by means of a novel tool comprised of first and second members pivotally joined to one another at a point intermediate their ends. The first ends of the first and second members form the tool handles, while the second ends form a pair of jaws. A first jaw has fixedly secured thereto an elongated rod having a stop secured to the free end thereof. The second jaw has a shorter rod affixed thereto with the free end thereof being provided with a guide means for slidingly engaging said first elongated rod. Also attached to the free end of said short rod is a second stop means. The tool is used by setting a C-shaped clip upon the surface of the elongated rod and placing the underside of one corrugated sheet upon the clip. The second folded sheet is placed upon the first sheet with its lower apex engaging the upper apex of the undersheet. The handles of the tool are then gripped and squeezed toward one another, causing the first and second stops provided on the first and second arms affixed to said jaws to move toward one another. This performs the simultaneous function of bending over the flanges of said C-shaped clip, as well as deforming the opposing ends of the engaging apexes of said corrugated sheets so that they form flat, parallel surfaces. The bent over flanges of the C-shaped clip act to rigidly secure the apexes of the two folded sheets to one another. The tool may then be released and the first and second stop means will move away from one another under control of suitable bias means, enabling the tool to be readily disengaged from the first and second corrugated sheets. Each engaging surface between the corrugated sheets is then secured together in the same manner as described above. This arrangement provides a fast, simple manner for affixing the apexes of corrugated sheets to one another. In addition thereto, the clips do not affect the uniformity and aesthetic qualities of the solar cell formed from such corrugated sheets. The tool, while being described as hand-operated, may also be powered by suitable electrical means to perform its clamping functions.

An alternative embodiment for affixing apexes of corrugated sheets to one another utilizes an elongated clip which is folded in half so as to completely surround the adjoining apexes. The first end of the clip is provided with an eyelet and the second end of the clip is provided with a projecting ear having dimensions suitable for being received by said eyelet. The clip may be applied by a tool having a handle and a solid metallic member projecting from the handle. This member is provided with first and second slots. The first slot has a width sufficient for receiving the end of said clip carrying said eyelet, enabling this end to be bent over and around said corrugated sheet to facilitate the threading of a projecting ear therethrough. After insertion of the projecting ear through the eyelet, the ear is bent back over itself and the second slot of said tool is pressed around the end of said clip to firmly squeeze the clip against the corrugated sheets, and further to deform the ends of the apexes of said corrugated sheets so as to form flat, parallel surfaces therebetween. The opposite end of said clip is treated in the same manner with said second slot being pressed against the clip to firmly press the clip against the corrugated sheet, thus acting to deform the ends of the apexes of said sheet. This alternative embodiment also provides excellent support between the adjacent corrugated sheets.

In installations which desire to employ such solar cells, but require a greater degree of privacy or a substantial decrease in the amount of solar radiation which is to penetrate through the solar cell, it is preferable to mount the corrugated sheets in the solar cell framework so that their apexes are inclined at an angle to the horizontal direction. In order to facilitate the insertion of the corrugated sheets into the cell framework, adjacent corrugated sheets are offset relative to one another with the first end of each sheet being set back a predetermined distance from the first end of the sheet immediately below it.

In order to permit the construction of such solar cells having corrugated sheets which are mounted in the solar cell framework with the sheets being inclined to the horizontal direction, the instant invention provides a novel clip means which is adapted to rigidly secure engaging apexes of the adjacent corrugated sheets, while at the same time maintaining the corrugated sheets in the desired offset position. A clip provided, therefore, is a substantially flat, elongated clip, having first and second projecting ears at spaced intervals along the length of said clip and also spaced inward from the ends of said clip. A first ear projects in the upward direction, while the second ear projects in the downward direction. The clips are mounted by inserting one end of one apex of the corrugated sheet between the downwardly projecting ear and the body of said clip. The end of said clip farthest from said downwardly projecting ear is then bent around the opposite end of said apex of said first corrugated sheet to firmly affix this end of the clip to the sheet. The second corrugated sheet is then positioned with a first end of its lower apex between the upwardly projecting ear and the body of said clip. The end of said clip farthest from said upwardly projecting ear is then bent around the opposite end of the lower apex of the second corrugated sheet so as to firmly affix the clip thereto. The lower corrugated sheet has its upward apex firmly secured between the lower projecting ear and a first end of the clip, while the upper corrugated sheet has its lower apex firmly secured by the upwardly projecting ear and a second end of said clip. With the upper and lower apexes of the first and second sheets, respectively, being rigidly secured to the same clip, the corrugated sheets are firmly positioned and secured to one another by means of the clip. Additional corrugated sheets may then be stacked one upon the other in a similar manner and readily inserted within the solar cell framework. The specific angle of inclination which the corrugated sheets make to the horizontal direction depends only upon the amount of light penetration desired by the user and this may easily be controlled by the positioning of the projecting ears on the clip. As an alternative to the clip having projecting ears, the corrugated sheets may each be provided with a single projecting ear positioned a spaced distance in from one end of the apex and being formed in such a manner as to project away from the outer curve surface of the apex. The corrugated sheets are then mounted in such a way that one end of the adjacent sheet is positioned between the projecting ear and the upper surface of the lower corrugated sheet from which the ear projects. Since both sheets are provided with such a projecting ear, securement is provided by having a first end of the lower sheet being secured beneath a downwardly projecting ear from the upper sheet and having a second end of the upper sheet being secured beneath the upwardly projecting ear of the lower corrugated sheet so as to provide two distinct points of securement between engaging apexes of adjacent corrugated sheets. The projecting ears may then be pressed downwardly so as to rigidly position and secure the sheet inserted therein.

In order to provide further versatility for the solar cell assemblies, it is necessary to provide a space relationship which governs the see-through and radiation penetration. This relationship is the width of the opening in the solar cell relative to the depth. In order to provide further flexibility of the height of each opening, the corrugated sheets instead of being stacked apex-to-apex, in the manner previously described, may be further adjusted so that the apexes are offset relative to one another, causing the height of the openings to be reduced in relationship to the amount of which the apexes are offset. This flexibility provides full control over the opening dimensions and depths, thus enabling the installation to provide advantageous use in a wide variety of applications.

Whether a solar cell is to be provided with corrugated sheets having their ends in alignment, or offset and inclined at an angle to the horizontal direction, any of the methods set forth above provide excellent means for securing engaging apexes of adjacent corrugated sheets, which methods are simple to perform and are extremely reliable in that they provide a solar cell having excellent uniformity and support.

It is therefore one object of the instant invention to provide novel solar cells and the like wherein the corrugated sheets of such solar cells are provided with excellent support.

Another object of the instant invention is to provide novel solar cells and the like wherein engaging apexes of corrugated sheets forming the solar cells are deformed at their ends to form flat engaging surfaces to improve the support therebetween.

Another object of the instant invention is to provide novel solar cells and the like wherein the ends of corrugated sheets forming such solar cells are deformed to provide flat engaging surfaces which are secured to one another by clip means to provide positioning and support therebetween.

Another object of the instant invention is to provide novel solar cells and the like wherein a novel clip is provided for rigidly positioning and securing solar cells to one another in an offset manner.

Another object of the instant invention is to provide a novel clip means for affixing corrugated sheets employed in solar cells and the like to one another in an offset manner.

Another object of the instant invention is to provide a novel clip means for affixing corrugated sheets employed in solar cells and the like to one another in an offset manner wherein said clip is provided with projecting ears positioned at spaced intervals along the length of said clip and intermediate its ends for the purpose of securing the engaging apexes of its adjacent corrugated sheets to one another.

Still another object of the instant invention is to provide novel corrugated sheets for use in forming solar cells and the like wherein the corrugated sheets are provided with projecting ears positioned along the apexes of the corrugated sheets at a point intermediate the ends thereof for receiving and securing an engaging apex of an adjacent sheet thereto.

Another object of the instant invention is to provide novel corrugated sheets for use in forming solar cells and the like wherein the corrugated sheets are stacked in such a manner that their apexes are offset relative to one another by an amount determined by the opening desired, which opening is defined by the profile of the corrugated sheets.

These and other objects of the instant invention will become apparent on reading the accompanying description and drawings in which:

FIGURE 1 is a perspective view of a solar cell.

FIGURE 2 is a perspective view of corrugated sheets arranged in an offset manner for use in forming a solar cell permitting light penetration of an amount substantially less than that permitted by the solar cell of FIGURE 1.

FIGURE 2a shows an end view of a solar cell formed with offset sheets of the type shown in FIGURE 2 and having a first end of the solar cell frame removed to show the internal arrangement.

FIGURE 2b shows an end view of a solar cell with the corrugated sheet members being stacked in an offset manner.

FIGURE 3 is a perspective view of a clip employed for the purpose of joining engaging apexes of adjacent corrugated sheets.

FIGURE 4 is a plan view of the tool employed for securing the clip of FIGURE 3 to the corrugated sheets.

FIGURE 5 is a perspective view of a portion of two corrugated sheets in the solar cell of FIGURE 1 showing the clip affixed thereto in greater detail.

FIGURE 6 is a perspective view showing an alternative embodiment of the clip of FIGURE 3.

FIGURE 7 is a perspective view of the tool employed for securing the clip of FIGURE 6.

FIGURE 8 is a perspective view of the clip of FIGURE 6 in the manner in which it is mounted to adjacent corrugated sheets.

FIGURE 9a is a perspective view of a clip employed in the solar cell shown in the FIGURES 2 and 2a.

FIGURE 9b is an end view of the clip of FIGURE 9a.

FIGURE 9c is a perspective view showing the manner of mounting the clip of FIGURES 9a and 9b in greater detail than that shown in FIGURE 2.

FIGURE 10a is a perspective view of an alternative embodiment for the clip of FIGURE 9a.

FIGURE 10b is an end view of the clip of FIGURE 10a.

FIGURE 10c is a perspective view showing the manner in which the clip of FIGURES 10a and 10b is mounted.

FIGURE 11a shows a portion of a corrugated sheet provided with a projecting ear.

FIGURE 11b is a perspective view showing the manner in which the projecting ear of FIGURE 11a is employed.

FIGURE 11c shows a side view of two corrugated sheets mounted in an offset manner and employing the projected ear shown in FIGURES 11a and 11b.

Referring now to the drawings, FIGURE 1 shows a solar cell 10 comprised of a plurality of corrugated metallic sheets 11. Each corrugated sheet 11 is formed from a substantially straight elongated sheet of metallic material which is bent by any suitable means to form the corrugated profile as shown in the figure. The solar cell 10 is formed by stacking such corrugated sheets 11 one upon the other such that the lower apexes 11a of each corrugated sheet rest upon the upper apexes 11b of the sheet lying immediately therebetween. Since both the upper and lower apexes 11a and 11b respectively, have an arcuate shape, the engaging surfaces provide extremely unstable support and permit the engaging apexes to experience lateral motion relative to one another. In order to provide adequate support between such engaging upper and lower apexes clip means 12 are provided at each engaging location for the purpose of rigidly securing and positioning engaging apexes to one another. The solar cell 10 may be provided with a substantially rectangular outer frame 13 having sides 13a–13d. Each of said sides are bent over at their extreme ends to form the flanges 14a–14d which are provided to secure the corrugated sheets 11 within the framework 13. While only the front face of the solar cell 10 is shown in FIGURE 1, it should be understood that flanges substantially identical to the flanges 14a–14d are provided along the border of the rear surface of the cell 10 so as to secure the corrugated sheets 11 within the framework 13.

Each of the corrugated sheets 11, shown in FIGURE 1, are all substantially equal and as can be seen in FIGURE 1, the forward edges 11c of the corrugated sheets 11 all lie substantially in a plane which is parallel to the front surface of the solar cell 10. Due to the fact that all of the corrugated sheets are of equal thickness, the rear edges (not shown in FIGURE 1) likewise lie substantially in a plane parallel to the rear face of solar cell 10. The corrugated sheets 11 of FIGURE 1 are aligned within the framework 13 such that the apexes are substantially parallel to the horizontal direction. This permits solar rays of certain angular inclinations to pass through the solar cell 11. In addition thereto the corrugated sheets 11 have surfaces which exhibit reflective properties so as to enable the solar rays to be deflected against the surfaces of the sheets so as to ultimately pass through the cell. However, certain angular inclinations of solar rays will fail to pass through so that a certain amount of radiation fails to permeate through the cell 10.

An entire wall may be formed of individual solar cells 10 by stacking the cells one on top of another and one along side the other to form any sort of partition or enclosure desired. The dimensions (length, width and height) of the solar cell may be varied, depending only upon the needs of the user.

In cases where it is desired to either increase the amount of privacy in the area enclosed by a structure formed of such solar cells or in the alternative, to decrease the amount of solar radiation permeating throughout the cells, the corrugated sheets forming the solar cell may be arranged in an offset manner such as that shown in FIGURE 2. The arrangement 15 shown therein is comprised of first and second corrugated sheets 11 with the upper apexes 11b of the lower sheet engaging the lower apexes 11a of the upper sheet in substantially the same manner as that shown in FIGURE 1. However, forward edge 11c of the upper sheet is set back a distance d from the forward edge 11c of the lower sheet. The corrugated sheets are held in this offset manner by a novel clip means 16, to be more fully described. Additional corrugated sheets may be stacked one upon the other in the same manner and employing the same clip means as that shown securing the first and second sheets of FIGURE 2. The manner in which the corrugated sheets 11 stacked in the offset manner, are mounted into the solar cell framework as shown in FIGURE 2a. In the arrangement shown therein, the solar cell 20 is comprised of a framework 13 substantially identical to the framework 13 shown in FIGURE 1. The end view shown in FIGURE 2a has the side 13b removed to show the manner in which the corrugated sheets 11 are mounted therein. The lowermost corrugated sheets has its lower right-hand corner resting against the side 13c of framework 13. The lower right-hand corner of the lowermost corrugated sheet is shown resting against the flange 14d. The upper right-hand corner of the lowermost sheet is shown resting against the rearward flange 14d' of the framework 13. As can clearly be seen, the apexes 11a and 11b of the corrugated sheets 11 are offset at an angle relative to the horizontal direction. The corrugated sheets 11 are maintained in the offset manner by virtue of the clip means 16, to be more fully described. Assuming the sun's rays to be coming from the direction shown by arrow 21 of FIGURE 2a, it can be seen that the offset arrangement of the figure acts to considerably reduce the amount of solar radiation which will penetrate through the solar cell 20. While it is possible that solar rays at certain angles of inclination will deflect off the surfaces of the corrugated sheets 11, even the act of deflection will not completely compensate for the amount of shading afforded by the inclined arrangement of the sheets 11.

Returning to FIGURE 2b, there is shown therein a slight modification of the solar cell arrangement of FIGURE 1, which modification provides additional means for controlling see through and radiation penetration through the solar cell assembly. In the arrangement of FIGURE 2b, it can be seen that the lower apexes 11a of the corrugated sheet 11 do not rest immediately upon the upper apexes 11b of the lower corrugated sheet 11', but are actually offset by a distance D relative to the center lines shown in the figure. As can be seen from FIGURE 2b, this offset arrangement diminishes the size of the openings such as, for example, the openings $O_1$ and $O_2$ defined by the two offset corrugated sheets. As can clearly be seen from the arrangement of FIGURE 2b, by diminishing the distance D between the two center lines of the apexes, the openings such as, for example, the openings $O_1$ and $O_2$ may be increased and conversely, by increasing the distance D between the center lines of the apexes, the openings such as, for example, the openings $O_1$ and $O_2$ may be decreased. This arrangement adds increased flexibility of control over the amount of see-through and radiation penetration through the solar cell arrangement. Thus, in addition to being able to offset corrugated sheets relative to one another in the manner shown in FIGURE 2, the corrugated sheets may further be offset in the manner shown in FIGURE 2b, to provide still further control over the degree of penetration which may occur through any solar cell. The fastening means 12 are substantially the same as those used in FIGURE 1 when assembling the solar cell of the type shown in FIGURE 1. The fastening means 12 may be altered to be of the type shown in FIGURE 2a when the corrugated sheets are stacked in a canted manner, shown in FIGURE 2. Thus, without changing any of the elements or their configurations and simply by offsetting the apexes of adjacent corrugated sheets, it is possible to provide further control over penetration of rays through the solar cell.

Returning to the solar cell of the type shown in FIGURE 1 the clip 12 employed for the purpose of securing engaging apexes of adjacent corrugated sheets to one another is shown in greater detail in FIG. 3. The clip 12 is a substantially thin, elongated metallic member having flanges 12a and 12b at opposite ends thereof, each of said flanges extending in the same direction. The means of application of clip 12 can best be seen from a consideration of FIGURE 5. As shown therein, two sections 11 and 11' of corrugated sheets are positioned with the lower apex 11a of sheet 11 engaging the upper apex 11b' of sheet 11'. The clip is positioned with its main body portion 12c lying against the underside of the upper apex 11b' of sheet 11' and with the flanges 12a and 12b projecting in the upward direction. The flanges are then bent down against the upper surface of sheet 11 so as to firmly clip the ends of the sheets 11 and 11' therebetween. In addition thereto sufficient pressure is applied during this bending operation so as to deform the ends of sheets 11 and 11' in the region of said flanges 12a and 12b so that substantially flat parallel surfaces are provided at these deformed regions. These flat parallel regions are securely held by the clip so as to prevent any relative lateral movement between the sections 11 and 11', thus insuring an extremely rigid support therebetween, thereby preserving the uniformity and appearance of the solar cell.

FIGURE 4 shows a tool 30 which may be employed for securing the clip 12 to the apexes of the corrugated sheets. The tool 30 is comprised of first and second members 31 and 32 pivotally secured to one another by means of a pin 33 inserted through suitable openings in members 31 and 32 at a point intermediate their ends. The lower ends 31a and 32a of members 31 and 32 respectively, form clipping handles for the tool while their upper ends 31b and 32b form the jaws to which is affixed the deforming and clip bending arrangement.

The jaw 32b is provided with an aperture 34 for receiving fastening means 35. The fastening means 35 is employed to secure a substantially straight rigid member 36 having a lower end 36a which is positioned between the surface 31c of hollow handle 31a and a pin member 37 secured to hollow handle 31a. Member 36 is provided with an arcuate shoulder 36b which rests against pin 37.

The upper end of member 36 positions and secures a second rigid member 38 at right angles thereto by a fastening member 39a. The free forward end of member 38 has a notch 39 provided for a purpose to be more fully described.

Jaw 31b is provided with a suitable aperture 40 for receiving fastening means 41 which secures a second member 42 (substantially similar to the first member 36) to the jaw 31b. The lower end 42a of member 42 is positioned between hollow handle 32a at pin means 43 and is further provided with an arcuate shoulder 42b which rests against pin 43.

The upper end of member 42 has an elongated rigid arm 44 secured at right angles thereto by fastening means 45. The free forward end of elongated rigid arm 44 is provided with a stop member 46 secured to member 44 by fastening means 47. Stop member 46 has a substantially C-shaped profile so as to form a slot 48 between the upper arm of stop 46 and the upper surface of elongated rigid member 44. Positioned within this slot 48 is a resilient cushion member 49 which may, for example, be formed of rubber.

The elongated rigid member 44 is slidingly engaged by guide means 50, which although it cannot clearly be seen from FIGURE 4, is a substantially C-shaped member having the arms of the member 50 secured to rigid member 38 by fastening means 51 and having the lower portion thereof being adapted to receive and slidingly engage the elongated member 44.

The manner in which the tool 30 of FIGURE 4 is used is as follows:

A clip 12, of the type shown in FIGURE 3, is positioned upon the elongated rigid member 44 in the manner shown in FIGURE 4 with the clip 12 being shown in dotted fashion. The upper and lower apexes, respectively, of the lower and upper corrugated sheets are then positioned upon the clip in the same manner as shown in FIGURE 5. The handles 31a and 32a are then gripped by the hand and move toward one another in the directions shown by arrows 52 and 53. Let it be assumed that the handle 32a remains substantially stationary. This causes the handle 31a to move in the direction shown by arrow 53 toward handle 32a. This causes its jaw 31b to move toward jaw 32b in the direction shown by arrow 54. Since handle 32a is considered to remain stationary, its jaw 32b does not move and hence the member 36, the member 38 and stop means 39 can also be considered to be stationary. With the jaw 31b moving in the direction of the arrow 54, this movement is imparted to rigid elongated rod 44 secured thereto causing the rod 44 and the stop means 46 to move in the direction of arrow 54. This causes the distances between the stop means 39 and 46 to be diminished thereby forcing the flanges 12a and 12b of clip 12 beneath the stop means gap 39 and 46. With the upper and lower apexes resting upon the central portion 12c of clip 12, this causes the flanges 12a and 12b to be bent around the apexes of the corrugated sheet, in the manner shown in FIGURE 5. The handle 31a may continue to be moved in the direction shown by arrow 53 until the stops 39 and 46 have moved to a point where they are separated by a distance substantially equal to the width of the corrugated sheets. There is no danger of damaging or deforming the corrugated sheets and the clip means due to the presence of the resilient cushion 49 which absorbs some of the pressure imparted to the clip 12 and the corrugated sheet apexes and also prevents the clip 12 from being bound into the slot 48 by metal to metal pressure by exerting a force outward against the end 12a of clip 12 at the instant of forming what is called a stripping action. The dimensions E of the slots formed by stops 39 and 46 are such as to provide a substantial amount of squeezing pressure upon the arcuate apexes of the corrugated sheets as well as the clip 12, causing the ends of these apexes to be deformed so as to form substantially flat regions. These flat regions are formed parallel to one another through the use of the tool 30 and these opposing parallel regions are rigidly secured to one another by virtue of the clip 12. This arrangement provides an extremely rigid mounting between engaging apexes of adjacent corrugated sheets and the assembly method is simple and rapid, with the entire operation being completed with just one squeezing motion of the tool handles 31a and 32a.

At the end of the squeezing motion the lower end 42a of member 42 has moved in the direction shown by arrow 56 relative to the stationary hollow handle 32a. This causes a spring member 57 affixed at one end to an eyelet (not shown) in member 42 and at the other end to a suitable means (not shown) at the lower end of handle 32a to have undergone stretching or tensioning by holding the handle 32a stationary and removing tension from the handle 31a. This enables the stretched spring means 57 to discharge, causing the member 42 to move in the direction shown by arrow 58 which, in turn, causes the stops 39 and 46 of the tool 30 to separate from one another in order to permit the removal of the corrugated sheet apexes and clip means from the slots formed by the stops 39 and 46.

FIGURE 6 shows an alternative embodiment for the clip 12 of FIGURE 3. The clip 51 of FIGURE 6 is comprised of an elongated metallic member which is bent at a point intermediate its ends to form a substantially U-shaped clip having first and second arms 52 and 53 substantially equal in length. The arm 53 is provided with an eyelet 54 near its free end and the arm 52 is provided with a projecting tongue 55 near its free end, which tongue 55 is slightly narrower than the width of the arm 52.

Turning now to FIGURE 7, there is shown therein a tool 55 projected for the purpose of securing the clip 51 to the corrugated sheets. The tool 55 is comprised of a handle 56 having a rigid metallic member 57 adjacent thereto. The forward end of member 57 is provided with a slit 59. The manner in which the tool 55 is used and the clip 51 is affixed will now be described with reference to FIGURES 6, 7 and 8:

The clip 51 has substantially flat arms 52 and 53. The first step in the assembly process is to insert the free end of the arm 53 carrying the eyelet 54 into the narrow slot 58 in tool 55. With the free end of arm 53 inserted into narrow slot 58 the clip is then bent over to form the flange 60, shown in FIGURE 6. The first and second corrugated sheets 11 and 11', shown in FIGURE 8, are then positioned relative to one another so that their upper, 11b, and lower, 11a apexes engage one another in the manner shown in FIGURE 8. The clip 51 is then positioned around the two corrugated sheets so that the apexes of the corrugated sheets lie between the arms 52 and 53. Tongue 55 is then inserted through the eyelet 54 and then bent upward so that it lies at an angle which is substantially rectangular with the arm 52. Tool 55 is then positioned so that its slot 59 receives the flange 60, as well as the underside of the arm 53 within the slot 58. The tool is then pushed in the direction shown by arrow 62 of FIGURE 8 relative to the sheets 11 and 11' so that the tongue 55 is bent back to the position shown in FIGURE 8. The tool 55, in addition to bending the tongue 52a backward also firmly presses the flange 60 against the surface of the upper apex 11a as well as deforming the forward ends of apexes 11a and 11b so as to form substantially flat engaging surfaces between the ends of these apexes. These surfaces are rigidly held together by the pressure of the clip. The tool 55 is then removed from the forward end of the clip and is pressed over the rearward end of the clip so as to press the bight firmly against the apexes of the sheets 11 and 11' to form substantially flat engaging surfaces at the rearward end of the sheets. These engaging surfaces are firmly held in place by means of the rearward end of the clip. The remaining engaging apexes of the corrugated sheets receive the clip in a similar manner. It can be seen that the clip 51 in the manner of applying it is simply and easily performed.

Turning now to FIGURES 9a and 9b, there is shown therein a clip 70 which is employed for the purpose of mounting corrugated sheets in the offset manner, as shown in FIGURES 2 and 2a. The clip 70 is comprised of a main body portion 71 having upwardly and downwardly projecting flanges 72 and 73, respectively, at opposite ends thereof. The main body portion 71 is provided with upwardly and downwardly projecting ears 74 and 75 positioned a spaced distance apart from one another and from their adjacent flanges.

Turning to a consideration of FIGURE 9c, the manner of assembly of corrugated sheets using the clip 70 is as follows:

The lower apex 11a of corrugated sheet 11 is positioned so that its forward edge 11c is inserted between the projecting ear 74 and the upper surface of the main body portion 71. The lower corrugated sheet 11' is then positioned so that its forward edge 11c' abuts against the inner surface of flange 73. The flange 73 is then bent around the upper apex 11b' of sheet 11' in the manner shown in FIGURE 9c. This bending operation may be performed by the tool 55 of FIGURE 7. The slot 58 of tool 55 may be made to be deep enough so that it can receive the projecting ear 74 in order to bend it down against the surface of corrugated sheet 11.

Immediately prior to the bending of flange 73 the rearward edge 11d' of corrugated sheet 11' is positioned so that it is received between the lower projecting ear 75 and the underside of main body portion 71. Flange 73 may then be bent in the manner described above. Flange 72 is then bent around the rearward end 11d of upper corrugated sheet 11, which operation can be performed by tool 55. In a like manner, the tool 55 may be provided with the slot 58 being deep enough to press the lower projecting ear 75 upward against the lower corrugated sheet 11'. The regions in which the projecting ears 74 and 75 and flanges 73 and 72 engage the apexes of the corrugated sheets 11 and 11', having been deformed to form a substantially flat region, thus provided extremely rigid support as between the corrugated sheets 11 and 11' and the clip 70.

Turning now to FIGURES 10a–10c, there is shown therein an alternative embodiment 80 for the clip 70 of FIGURES 9a–9c. The clip 80 is comprised of a main body portion 81 having upward and downwardly projecting flanges 82 and 83. The main body portion 81 is provided with a pair of upwardly projecting ears 84 and a second pair of downwardly projecting ears 85 which are positioned at spaced intervals from one another and from the ends of the clip 80. The manner of joining the upper and lower corrugated sheets 11 and 11' is shown in FIGURE 10c and is substantially identical to the manner of assembly shown in FIGURE 9c with the exception that the forward edge 11c of the upper corrugated sheet 11 is positioned between the upper surface of main body portion 81 and both pairs of upwardly projecting ears 84. The rearward portion of lower corrugated sheet 11' is joined in substantially a similar manner. The flanges 82 and 83 and projecting ear pairs 84 and 85 may also be forced against the apexes of the corrugated sheets, using a tool of the type shown in FIGURE 7. The effectiveness of the clips 70 and 80 of FIGURES 9a and 10a, respectively, are substantially equal.

Turning now to FIGURES 11a–11c, there is shown therein an embodiment in which the use of the clip may be completely avoided by providing a projecting ear along the apexes of the corrugated sheets. For example, considering FIGURE 11b, the lower corrugated sheet 11 is provided with an upwardly projecting ear 90 which receives the right-hand edge of the upper corrugated sheet 11' in the manner shown in FIGURE 11b. The upper corrugated sheet is provided with a similar projecting ear 90' which receives the left-hand edge 11d of lower corrugated sheet 11. A detailed view of the projecting ear 90 is shown in FIGURE 11a and is formed by depressing a portion of the apex of the corrugated sheet outwardly to form the depression 91. A substantially C-shaped configuration 92 is then cut through the corrugated sheet simultaneously with the forming of the depression 91 so as to form the projecting ear 90 which lies a slight distance away from the upper surface of the corrugated sheet so as to receive the forward edge of an adjacent corrugated sheet therebetween. A detailed perspective view of the manner in which the projecting ear 90 receives the upper corrugated sheet is shown in FIGURE 11b. A tool of the type shown in FIGURE 7, with a notch 58 which is deep enough to press the projecting ear 90 downward against the surface of the lower apex of corrugated sheet 11' may be employed. Any other suitable tool may be used in order to provide firm support between the adjacent corrugated sheets. The rearward projecting ear may be firmly pressed against the lower corrugated sheet in a like manner. This arrangement provides the necessary support and set-off arrangement between adjacent corrugated sheets while completely avoiding the necessity of an additional clip, thereby simplifying the assembly process of solar cells having corrugated sheets arranged in the set-off manner.

It can be seen from the foregoing that the instant invention provides a novel method for forming solar cells by the use of either independent or intergrated clip means for joining engaging surfaces of adjacent corrugated sheets in such a manner that the ends of such engaging surfaces are deformed to form flat surfaces to make the engaging locations more stable thus providing an extremely rigid solar cell structure. The methods applied herein are simple and may be quickly performed and provide extremely rigid solar cell structures.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A solar cell comprising a substantially rectangular outer frame comprised of interconnected side walls having inturned free edges forming inwardly facing channel members, a plurality of elongated sheets each having a corrugated profile providing alternating upward and downward corrugations, said sheets being arranged in successively adjacent relation with the upward corrugations and downward corrugations of respectively adjacent sheets being in physical engagement at selected localities to define a cellular assembly having appreciable depth sufficient to block the passage therethrough of direct sunlight over a wide range of angular solar positions, said cellular assembly filling said rectangular outer frame and being held therein solely by contact between said cellular assembly and said channel members; clip means holding a plurality of pairs of adjacent corrugations of said sheets together at the localities of said physical engagement, each of said clip means comprising a part extending around the edge of one of said sheets at the said localities of engagement, said part overlying the surface of said last-mentioned sheet which is opposite to the surface that abuts the adjacent sheet, and said clip means being arranged with said part clamping the last-mentioned sheet against the adjacent sheet at said locality of engagement, and portions of said adjacent sheets at said locality being deformed to provide substantially flat parallel engaging surfaces for providing rigid stable support therebetween.

2. The combination of claim 1, in which said clip means comprises a metal band embracing said sheets at said localities of engagement.

3. The combination of claim 1, in which said clip means comprises a metal band embracing said sheets at said localities of engagement and having a tongue at one end thereof in engagement with a slot at the other end thereof.

4. The combination of claim 1, in which successive of said sheets are rearwardly offset in respect to each other, and said clip means provides projecting ears arranged along said localities of engagement and extending in a direction away from the edge of said sheets closest to said ears; the edge of each of said sheets remote from the projecting ear along its apex being positioned beneath the projecting ear of said clip.

5. The combination of claim 4, in which said projecting ears are integral with said sheets at said localities of engagement.

6. The combination of claim 4, in which said clip means comprises separable elongated metallic bands having opposite ends thereof embracing the edges of respective adjacent sheets at said localities of engagement, and having an integral tongue at each end thereof in engagement with the adjacent edge of the other respective sheet.

References Cited

UNITED STATES PATENTS

| | | | |
|---|---|---|---|
| 443,331 | 12/1890 | Price | 52—660 |
| 756,861 | 4/1904 | Layton | 52—665 |
| 1,147,100 | 7/1915 | Rietzel | 52—665 |
| 1,356,151 | 10/1920 | Jackson | 52—666 |
| 1,727,214 | 9/1929 | Niccum | 52—666 |
| 1,809,870 | 6/1931 | Smith | 52—660 |
| 1,859,664 | 5/1932 | Fulda | 52—666 |
| 1,878,992 | 9/1932 | Shelton | 52—660 |
| 2,990,923 | 7/1961 | Macias-Sarria | 52—666 |
| 3,033,086 | 5/1962 | Marsden | 52—666 |

FOREIGN PATENTS

| | | |
|---|---|---|
| 647,092 | 7/1928 | France. |
| 781,573 | 1935 | France. |
| 810,922 | 1/1937 | France. |

FRANK L. ABBOTT, *Primary Examiner.*

J. L. RIDGILL, *Assistant Examiner.*